US007011904B2

(12) United States Patent
Bunker

(10) Patent No.: US 7,011,904 B2
(45) Date of Patent: Mar. 14, 2006

(54) FLUID PASSAGES FOR POWER GENERATION EQUIPMENT

(75) Inventor: Ronald Scott Bunker, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 28 days.

(21) Appl. No.: 10/064,605

(22) Filed: Jul. 30, 2002

(65) Prior Publication Data

US 2004/0023093 A1 Feb. 5, 2004

(51) Int. Cl.
*H01M 8/12* (2006.01)

(52) U.S. Cl. .............................. 429/26; 429/34; 429/38; 165/166

(58) Field of Classification Search ................. 429/34, 429/38, 39, 30, 33, 16, 46, 26, 120; 165/166, 165/167, 109.1
See application file for complete search history.

(56) References Cited

U.S. PATENT DOCUMENTS

| 4,155,981 | A | * | 5/1979 | Chubb ........................ 422/198 |
| 4,732,713 | A | | 3/1988 | Korsell |
| 4,781,248 | A | * | 11/1988 | Pfeiffer ........................ 165/167 |
| 5,660,525 | A | | 8/1997 | Lee et al. |
| 5,806,584 | A | | 9/1998 | Thonon et al. |
| 6,199,626 | B1 | | 3/2001 | Wu et al. |
| 6,382,907 | B1 | | 5/2002 | Bregman et al. |
| 2002/0026999 | A1 | | 3/2002 | Wu et al. |
| 2002/0086200 | A1 | * | 7/2002 | Margiott ........................ 429/38 |

FOREIGN PATENT DOCUMENTS

| DE | 19923426 A | 1/2001 |
| JP | 07105960 A | 4/1995 |
| WO | WO 9957781 A | 11/1999 |

OTHER PUBLICATIONS

RS Bunker, Latticework (Vortex) Cooling Effectiveness Pat 1: Stationary Channel Experiments, Proceedings of ASME Turbo Expo 2004, Power for Land, Sea, and Air, Jun. 14-17,2004, Vienna, Austria, PP. 1-15.
Copy of European Patent Office Search Report Dated Dec. 15, 2003.

* cited by examiner

*Primary Examiner*—Raymond Alejandro
(74) *Attorney, Agent, or Firm*—Ann M. Agosti; Patrick K. Patnode

(57) ABSTRACT

A cooling apparatus for fuel cell components is provided wherein the cooling apparatus comprises a base plate having a first end and a second end and a first side plate coupled to the first end and a second side plate coupled to the second end. A plurality of bottom ribs are coupled to the base plate and a plurality of upper ribs are coupled to the bottom ribs. In addition, a top channel and a bottom channel are formed between each of the plurality of upper ribs and each of the plurality of bottom ribs, respectively, wherein the top channel and the bottom channel are disposed to allow a flow of a fluid therethrough and disposed to allow a portion of the fluid to alternate between the top channel and the bottom channel at a flow redirection area so as to enhance the heat transfer rate between the fluid and the fuel cell components.

17 Claims, 3 Drawing Sheets

US 7,011,904 B2

FLUID PASSAGES FOR POWER GENERATION EQUIPMENT

BACKGROUND OF INVENTION

The present invention relates generally to power generation equipment, and more particularly to improved fluid passages for solid oxide fuel cells.

A high temperature, solid oxide fuel cell stack is typically comprises planar cross flow fuel cells, counterflow fuel cells and parallel flow fuel cells that are constructed from flat single cell members and associated with fuel and air distribution equipment. Such members typically comprise trilayer anode/electrolyte/cathode components which conduct current from cell to cell and comprise at least one interconnect having channels for gas flow into a cubic structure or stack.

Solid oxide fuel cells generate electrical energy through electrochemical reactions between an oxidant and hydrocarbon fuel gas to produce a flow of electrons in an external circuit. In addition, solid oxide fuel cells generate waste heat that is typically removed via an oxidant in order to maintain a desired temperature level of solid oxide fuel cell components such as the anode, cathode and electrolyte.

While solid oxide fuel cells have demonstrated the potential for high efficiency and low pollution in power generation, some problems remain associated with temperature regulation of the components in solid oxide fuel cells. Solid oxide fuel cells typically comprise cooling channels in which the oxidant, typically air, is used to aid in the transfer or removal of the waste heat so as to maintain the stack temperature at or below prescribed limits and maintain a predetermined thermal gradient in the solid oxide fuel cell. In some designs, such cooling channels typically comprise smooth straight channels that have an undesired characteristic of providing low thermal transfer coefficients between the channel surface and the oxidant.

Accordingly, there is a need in the art for a solid oxide fuel cell having improved fluid passages that provide improved heat transfer characteristics.

SUMMARY OF INVENTION

One embodiment of the present invention comprises a cooling apparatus for fuel cell components comprising a base plate having a first end and a second end and a first side plate coupled to the first end and a second side plate coupled to the second end. A plurality of bottom ribs are coupled to the base plate and a plurality of upper ribs are coupled to the bottom ribs. In addition, a top channel and a bottom channel are formed between each of the plurality of upper ribs and each of the plurality of bottom ribs, respectively, wherein the top channel and the bottom channel are disposed to allow a flow of a fluid therethrough and disposed to allow a portion of the fluid to alternate between the top channel and the bottom channel at a flow redirection area so as to enhance the heat transfer rate between the fluid and the fuel cell components.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
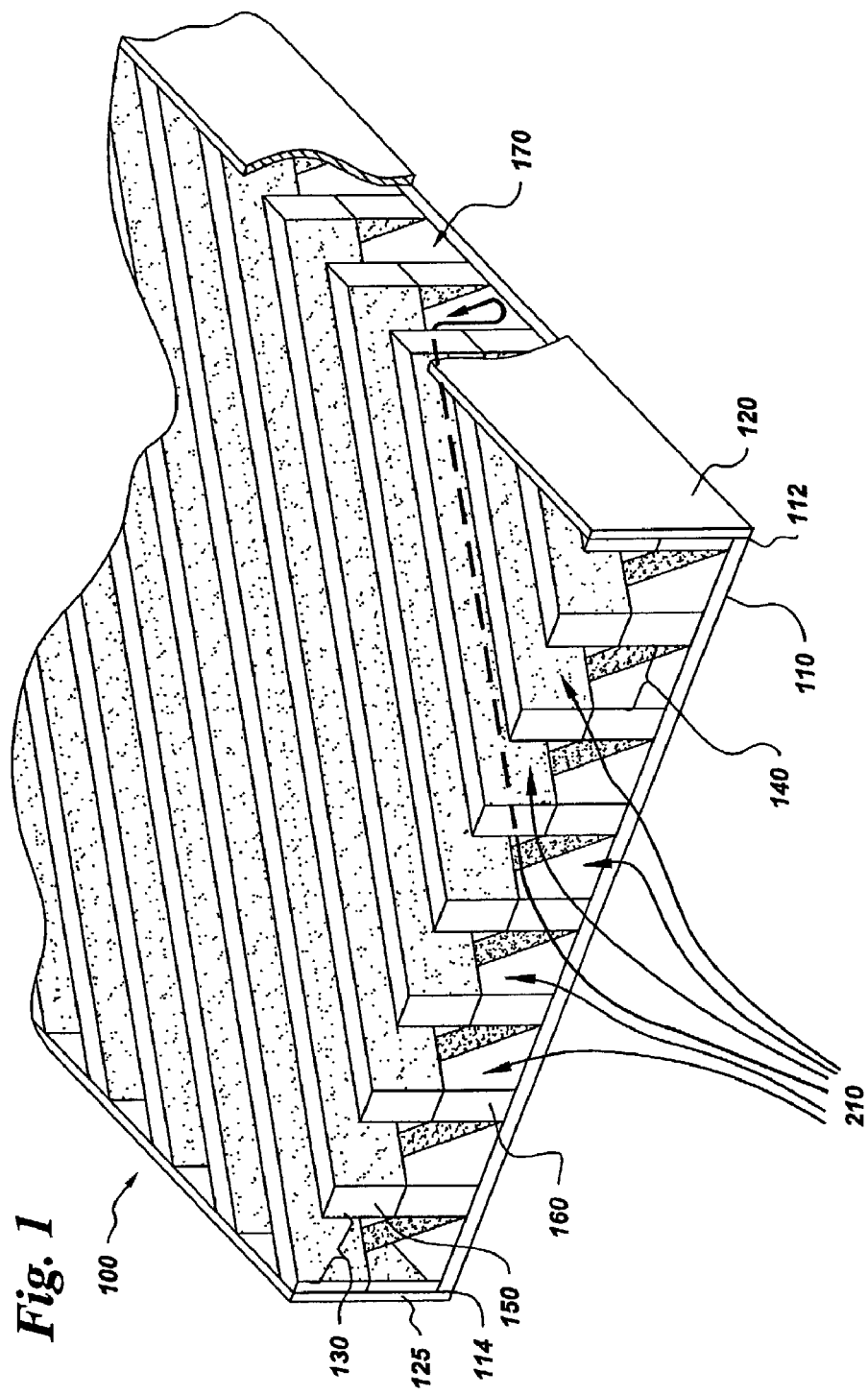
FIG. 1 is a perspective view of a cooling apparatus for a fuel cell in accordance with one embodiment of the present invention.

A cooling apparatus 100 is provided for a fuel cell in FIG. 1. The cooling apparatus 100 comprises a (meaning at least one) base plate 110 having a first end 112 and a second end 114. A first side plate 120 is coupled to the first end 112 and a second side plate 125 is coupled to the second end. As used herein, the term "coupled" refers to a mechanical attachment of members of cooling apparatus 100 and includes, without limitation, welding, brazing, soldering and the like, as well as machining and casting the members as a single part. A plurality of bottom ribs 160 coupled to the base plate 110 and a plurality of upper ribs 150 coupled to the bottom ribs 160. In addition, cooling apparatus comprises a (meaning at least one) top channel 130 and a (meaning at least one) bottom channel 140 formed between each of said plurality of upper ribs 150 and each of said plurality of bottom ribs 160, respectively. The top channel 130 and the bottom channel 140 are disposed to allow a flow of a fluid 210 therethrough. Furthermore, the top channel 130 and the bottom channel 140 are disposed to allow a portion of the fluid 210 to alternate between the top channel 130 and the bottom channel 130 at a flow redirection area 170 so as to enhance the heat transfer rate between the fluid 210 and the fuel cell components, for example, an anode 180, cathode 200 and electrolyte 190 (see FIG. 2). The fuel cell is typically selected from the group consisting of solid oxide fuel cells, proton exchange membrane or solid polymer fuel cells, molten carbonate fuel cells, phosphoric acid fuel cells, alkaline fuel cells, direct methanol fuel cells, regenerative fuel cells, and protonic ceramic fuel cells.

In solid oxide fuel cells, for example, an oxidant (e.g. oxygen molecules) passes through the cathode 200 and forms oxygen ions at a cathode electrolyte interface 220. For purposes of simplicity, the term "solid oxide fuel cell" will hereinafter be generically described as a "fuel cell". Subsequently, the oxygen ions migrate through the electrolyte 190 to combine with a fuel (typically gaseous fuel) at an anode electrolyte interface 230 thereby releasing electrons at the anode 180. The electrons are collected at the cathode 200 through an external load circuit (not shown) thereby generating a flow of electrical current in the external load circuit from the anode 180 to the cathode 200. As a result of the interactions at the anode electrolyte interface 230, the fuel cell generates heat that must be removed in order to maintain a desired temperature level and a predetermined thermal gradient in the fuel cell. In one embodiment of the present invention (see FIG. 2), such removal of heat is typically accomplished by disposing upper ribs 150 of cooling apparatus 100 over the cathode 200 and introducing the fluid 210, typically an oxidant, into the top and bottom channels 130,140 (as indicated by the solid arrows in drawing FIG. 2) so that the oxidant fluid flow removes heat energy from the fuel cell as it travels therethrough. As used herein, the terms "over", "thereon", "therein", "above", "under", "into", "on" and the like are used to refer to relative location of elements of the cooling apparatus 100 as illustrated in the Figures and are not meant to be a limitation in any manner with respect to the orientation or operation of the cooling apparatus 100. The upper ribs 150 are typically disposed at an angle (designated "A" in drawing FIG. 2) in the range between about 30 degrees and about 120 degrees with respect to the bottom ribs 160. In another embodiment of the present invention, the removal of heat is accomplished by disposing the upper ribs 150 of cooling apparatus 100 over the anode 180 (not shown) and introducing the fluid 210, typically a gaseous fuel, into the top and bottom channels 130,140. It will be appreciated that the function of the cooling apparatus 100 and any embodiments mentioned herein are also applicable to such gaseous fuel.

The cooling apparatus 100 comprises the top channel 130 and the bottom channel 140 being disposed to allow a portion of the fluid 210 to alternate between the top channel 130 and the bottom channel 140 at a flow redirection area 170 so as to enhance the heat transfer rate between the fluid 210 and the fuel cell components, for example, the anode 180, cathode 200 and electrolyte 190. In one exemplary embodiment, the fluid 210 is introduced into the top and bottom channels 130, 140 wherein a top channel fluid 240 (a portion of fluid 210 introduced at the top channel 130) is redirected at the flow redirection area 170 to the bottom channel 140 and a bottom channel fluid 250 (a portion of fluid 210 introduced at the bottom channel 140) is redirected at the flow redirection area 170 to the top channel 130. As used herein, the term "flow redirection area" refers to an area where a portion of the fluid 210 (e.g. the top channel fluid 240) changes direction and enters the bottom channel 140 and it also refers to an area where a portion of the fluid 210 (the bottom channel fluid 250) changes direction and enters the top channel 130.

Figure 2:
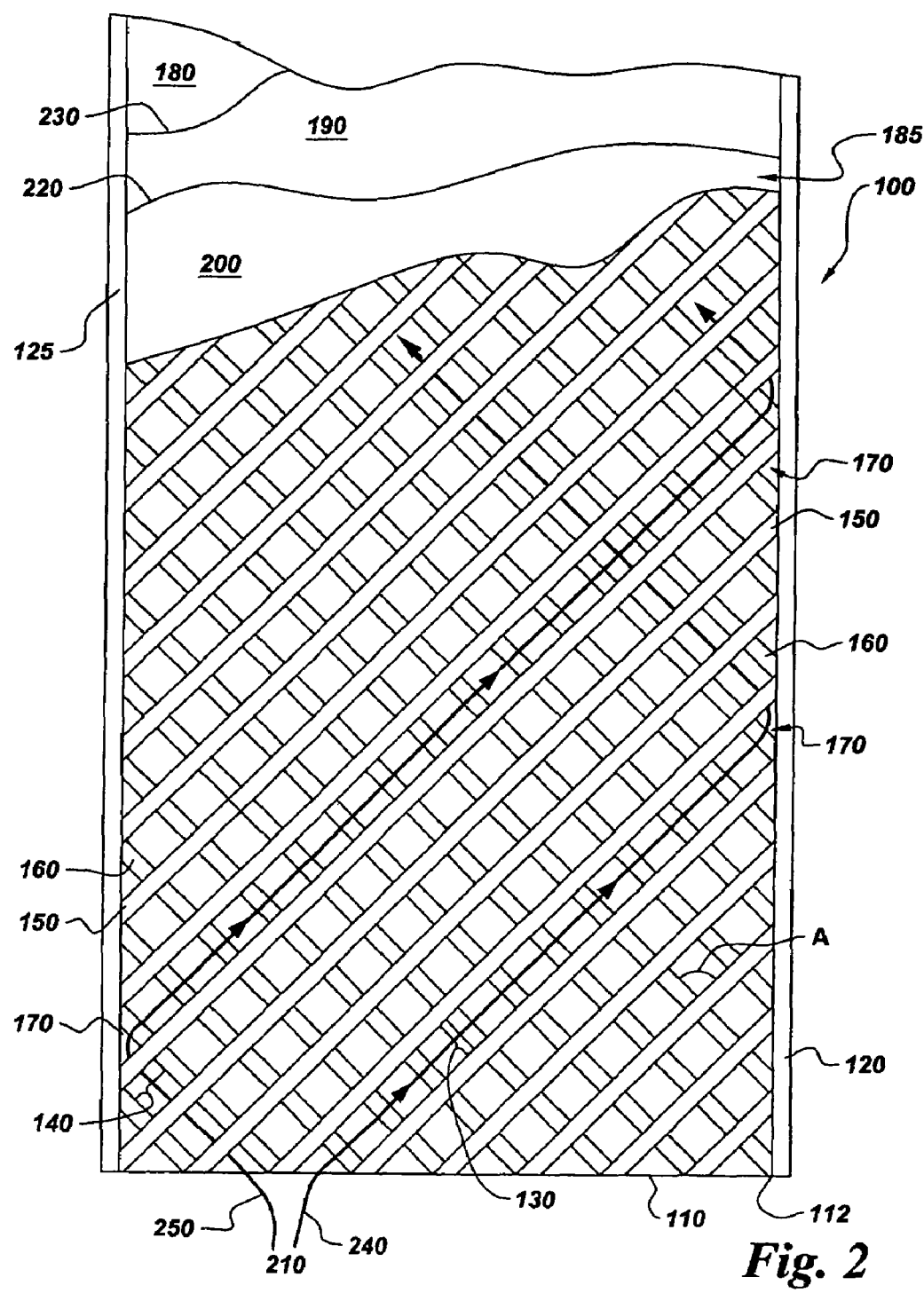
FIG. 2 is a top perspective view of FIG. 1 including an anode, cathode and electrolyte disposed thereon.

By redirecting a portion of the fluid 210, to the top or bottom channels 130, 140, the heat transfer rate between the cooling apparatus 100 and the fuel cell components is increased compared to conventional fuel cells. By way of example and not limitation, FIG. 2 shows the top channel fluid 240 introduced through the top channel 130 until reaching the flow redirection area 170. The flow redirection area 170 serves to locally enhance the heat transfer from on all sides of the top and bottom channels 130,140 compared to conventional fuel cells having smooth straight channels. Such localized heat transfer enhancement created is typically carried downstream by the top channel fluid 240 and is subsequently redirected to the bottom channel 140 at the flow redirection area 170 when the top channel fluid 240 contacts one of the first or second side plates 120,125. One aspect of the present invention is that by redirecting the flow of fluid 210 to either the top channel 130 or the bottom channel 140, the variance of the thermal gradient present in the fuel cell is reduced compared to conventional fuel cells. Such thermal gradients typically result from varying fuel utilization, variable fuel cell component material properties or variable anode or cathode porosities, for example. It will be appreciated that the number of top and bottom channels 130,140 and the number of flow redirection areas 170 are left to the artisan to determine based upon predetermined design requirements, for example, heat transfer rate and thermal gradient uniformity. In addition, the width and length of the region between the side walls 120 and 125 as well as the shape and dimensions for the top and bottom channels 130, 140 and the upper and bottom ribs 150,160 are left to the artisan depending upon a desired application.

In one embodiment of the present invention, plurality of concavities 260 (FIG. 3) are disposed on a surface portion of the top channel 130 (FIG. 1) and disposed on a surface portion of the bottom channel 140 (FIGS. 1–2). As used herein, the term "concavity" refers to depressions, indentations, dimples, pits or the like. In another embodiment, the plurality of concavities 260 are disposed on a surface portion of the upper ribs 150 and the bottom ribs 160. The shape of the concavities 260 is typically hemispherical or inverted and truncated conically shaped. In some embodiments, the shape of the concavities 260 is typically any sector of a full hemisphere. It will be appreciated that in other embodiments, the concavities 260 may be disposed on an entirety or a surface portion of the cathode 200, the anode 180 or both the cathode 200 and anode 180 depending on a desired application.

The concavities 260 (see FIG. 3) are formed on the abovementioned surfaces in a predetermined pattern that serves to enhance the heat transfer from the fuel cell components, typically the anode 180, cathode 200 and electrolyte 190, to the fluid 210, such as the oxidant (see FIG. 2). In one embodiment, the concavities 260 are disposed an an entirety of the abovementioned surfaces. In another embodiment, the concavities 260 are disposed on a portion of the abovementioned surfaces. It will be appreciated that the position and orientation of the upper ribs 150 and the bottom uibs 160 and the location of the concavities 260 on such ribs 150,160 (as shown in FIG. 1) can vary and the position, orientation and location of the upper and bottom ribs 150, 160 and concavities 260 disposed thereon (as shown in FIG. 3) are used by way of illustration and not limitation.

The concavities 260 (see FIG. 3) are formed on the abovementioned surfaces in a predetermined pattern that serves to enhance the heat transfer from the fuel cell components, typically the anode 180, cathode 200 and electrolyte 190, to the fluid 210, such as the oxidant (see FIG. 2). In one embodiment, the concavities 260 are disposed on an entirety of the abovementioned surfaces. In another embodiment, the concavities 260 are disposed on a portion of the abovementioned surfaces. It will be appreciated that the position and orientation of the upper ribs 150 and the bottom ribs 160 and the location of the concavities 260 on such ribs 150, 160 can vary and the position, orientation and location of the upper and bottom ribs 150, 160 (as shown in FIG. 1) and concavities 260 disposed thereon (as shown in FIG. 3) are used by way of illustration and not limitation.

Figure 3:
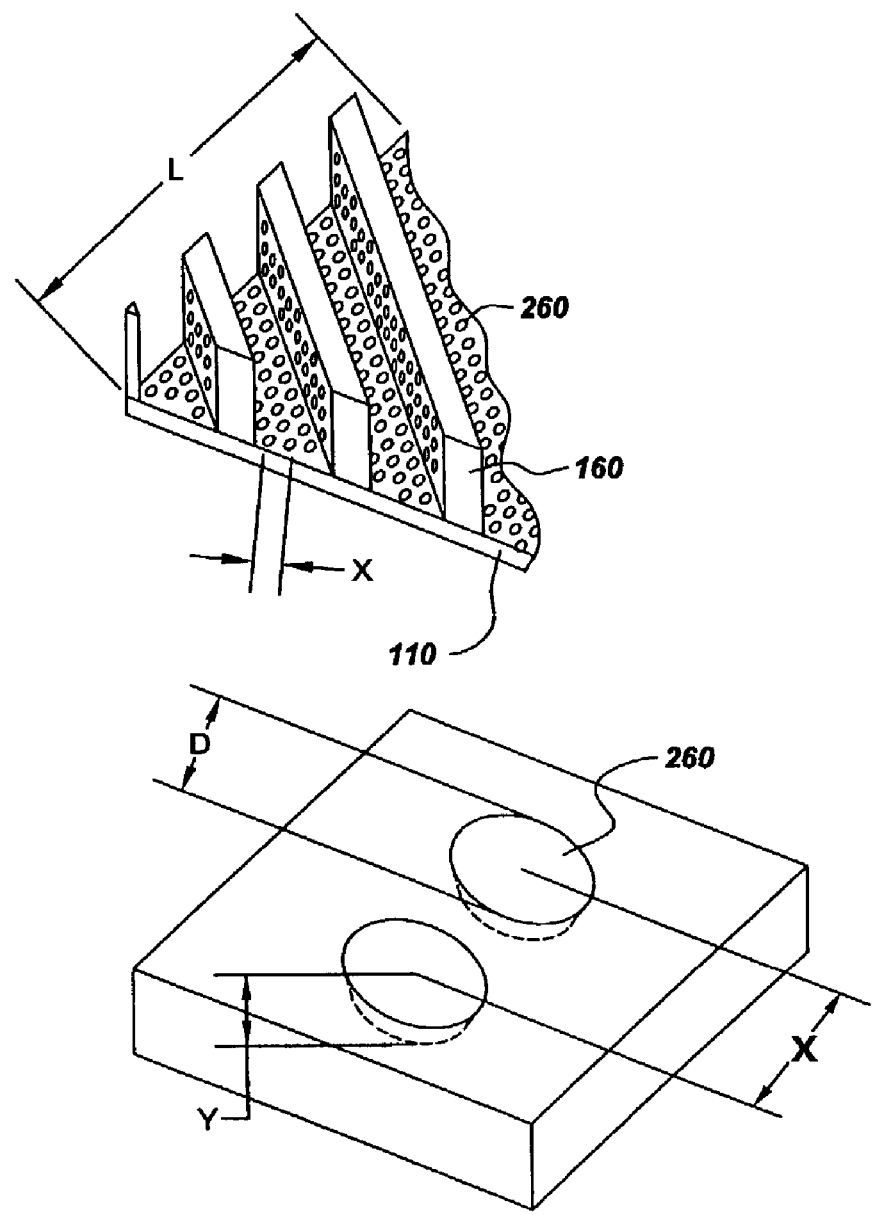
FIG. 3 is a perspective view of a portion of a base plate and a plurality of ribs having a plurality of concavities disposed thereon in accordance with another embodiment of the present invention.

The depth "Y" for a given one of the concavities 260 typically remains constant through the length "L" of the cooling apparatus 100 (see FIG. 3). The depth "Y" is generally in the range between about 0.10 to about 0.50 times the concavity surface diameter "D". in addition, the depth "Y" of the concavities 260 is in the range between about 0.002 inches to about 0.25 inches. The center-to-center spacing "X" of the concavities 260 is generally in the range between about 1.1 to about 2 times the surface diameter "D" of the concavities 260. In one embodiment, the concavities 260 are typically formed by using a pulse electrochemical machining (PECM) process. In an alternative embodiment, the concavities 260 are typically formed by using an electro-discharge machining (EDM) process.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A cooling apparatus for fuel cell components comprising:
   a base plate having a first end and a second end;
   a first side plate coupled to said first end and a second side plate coupled to said second end;
   a plurality of bottom ribs coupled to said base plate;
   a plurality of upper ribs in physical contact with said bottom ribs; and
   a top channel and a bottom channel formed between each of said plurality of upper ribs and each of said plurality of bottom ribs, respectively, wherein said top channel and said bottom channel are disposed to allow an initial flow of a single fluid therethrough in a top direction through said top channel and a bottom direction through said bottom channel, the top direction and the bottom direction comprising different directions, and disposed to allow a portion of said fluid to alternate between said top channel and said bottom channel at a flow redirection area so as to enhance the heat transfer rate between said fluid and said fuel cell components.

2. The cooling apparatus of claim 1, wherein said fuel cell components are selected from the group consisting of cathodes, anodes and electrolytes.

3. The cooling apparatus of claim 1, wherein a plurality of concavities are disposed on a surface portion of said top channel and disposed on a surface portion of said bottom channel so as to cause hydrodynamic interactions and affect the heat transfer rate between said fluid and said concavities when said fiuld is disposed over said concavities.

4. The cooling apparatus of claim 3, wherein said concavities are selected from the group consisting of depressions, indentations, dimples and pits.

5. The cooling apparatus of claim 3, wherein the shape of said concavities is selected from the group consisting of hemispherical, inverted, truncated conical and combinations thereof.

6. The cooling apparatus of claim 1, wherein said fluid is selected from the group consisting of gaseous fuels and oxidants.

7. The cooling apparatus of claim 1, wherein said upper ribs are disposed at an angle in the range between about 30 degrees and about 120 degrees with respect to said bottom ribs.

8. A fuel cell assembly comprising:
   at least one fuel cell having at least two electrodes and an electrolyte disposed therebetween;
   at least one cooling apparatus disposed over at least one of said electrodes, said cooling apparatus comprising:
   a base plate having a first end and a second end;
   a first side plate coupled to said first end and a second side plate coupled to said second end;
   a plurality of bottom ribs coupled to said base plate;
   a plurality of upper ribs in physical contact with said bottom ribs; and
   a top channel and a bottom channel formed between each of said plurality of upper ribs and each of said plurality of bottom ribs, respectively,
   wherein said top channel and said bottom channel are disposed to allow an initial flow of a single fluid therethrough in a top direction through said top channel and a bottom direction through said bottom channel, the top direction and the bottom direction comprising different directions, and disposed to allow a portion of said fluid to alternate between said top channel and said bottom channel at a flow redirection area so as to enhance the heat transfer rate between said fluid and said fuel.

9. The fuel cell assembly of claim 8, wherein said fuel cell is selected from the group consisting of solid oxide fuel cells, proton exchange membrane or solid polymer fuel cells, molten carbonate fuel cells, phosphoric acid fuel cells, alkaline fuel cells, direct methanol fuel cells, regenerative fuel cells, and protonic ceramic fuel cells.

10. The fuel cell assembly of claim 8, wherein said electrodes are selected from the group consisting of cathodes and anodes.

11. The fuel cell assembly of claim 8, wherein a plurality of concavities are disposed on a surface portion of said electrodes so as to cause hydrodynamic interactions and affect the heat transfer rate between said fluid and said fuel cell when said fluid is disposed over said concavities.

12. The fuel cell assembly of claim 8, wherein said fluid is selected from the group consisting of gaseous fuels and oxidants.

13. The fuel cell assembly of claim 8, wherein said upper ribs are disposed at an angle in the range between about 30 degrees and about 120 degrees with respect to said bottom ribs.

14. The cooling apparatus of claim 8, wherein a plurality of concavities are disposed on a surface portion of said top channel and disposed on a surface portion of said bottom channel so as to cause hydrodynamic interactions and affect the heat transfer rate between said fluid and said concavities when said fluid is disposed over said concavities.

15. The fuel cell assembly of claim 14, wherein said concavities are selected from the group consisting of depressions, indentations, dimples and pits.

16. The cooling apparatus of claim 14, wherein the shape of said concavities is selected from the group consisting of hemispherical, inverted, truncated conical and combinations thereof.

17. A cooling apparatus for fuel cell components comprising:
   a base plate having a first end and a second end;
   a first side plate coupled to said first end and a second side plate coupled to said second end;
   a plurality of bottom ribs coupled to said base plate;
   a plurality of upper ribs coupled to said bottom ribs; and
   a top channel and a bottom channel formed between each of said plurality of upper ribs and each of said plurality of bottom ribs, respectively,
   wherein said top channel and said bottom channel are disposed to allow an initial flow of a single fluid therethrough in a top direction through said top channel and a bottom direction through said bottom channel, the top direction and the bottom direction comprising different directions at an angle in the range between about 30 degrees and about 120 degrees with respect to each other, and disposed to allow a portion of said fluid to alternate between said top channel and said bottom channel at a flow redirection area so as to enhance the heat transfer rate between said fluid and said fuel cell components.

* * * * *